US009983713B2

(12) United States Patent
Liu et al.

(10) Patent No.: US 9,983,713 B2
(45) **Date of Patent: *May 29, 2018**

(54) TOUCH DISPLAY AND METHOD FOR MANUFACTURING THE SAME

(71) Applicant: TPK Touch Solutions Inc., Taipei (TW)

(72) Inventors: Chen-Yu Liu, Taoyuan (TW); Li-Wei Kung, Taoyuan (TW); Hsi-Chien Lin, Hsinchu (TW); Hong-Siang Shao, Taipei (TW)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/397,057

(22) Filed: Jan. 3, 2017

(65) Prior Publication Data

US 2017/0115787 A1 Apr. 27, 2017

Related U.S. Application Data

(63) Continuation of application No. 14/483,134, filed on Sep. 10, 2014, now Pat. No. 9,535,524.

(30) Foreign Application Priority Data

Sep. 10, 2013 (CN) .......................... 2013 1 0410710

(51) Int. Cl.

| | |
|---|---|
| ***G06F 3/045*** | (2006.01) |
| ***G06F 3/041*** | (2006.01) |
| ***G06F 3/044*** | (2006.01) |
| ***G02B 27/28*** | (2006.01) |

(52) U.S. Cl.

CPC ......... *G06F 3/0412* (2013.01); *G02B 27/286* (2013.01); *G06F 3/044* (2013.01); *G06F 2203/04103* (2013.01); *G06F 2203/04112* (2013.01)

(58) Field of Classification Search

None

See application file for complete search history.

(56) References Cited

U.S. PATENT DOCUMENTS

| | | | | |
|---|---|---|---|---|
| 2010/0231549 A1* | 9/2010 | Chien | ................ | G02F 1/13338 345/174 |
| 2013/0258568 A1* | 10/2013 | Iwata | ........................ | H01B 1/22 361/679.01 |
| 2013/0335822 A1* | 12/2013 | Yeh | ...................... | H05K 3/4685 359/483.01 |
| 2014/0133074 A1* | 5/2014 | Zahler | ................ | H04M 1/0266 361/679.01 |

FOREIGN PATENT DOCUMENTS

JP 2010192186 A * 9/2010

OTHER PUBLICATIONS

Merriam Webster Online Dictionary definition of disposed, https://www.merriam-webster.com/dictionary/disposed, p. 1.*

* cited by examiner

*Primary Examiner* — Ilana Spar
*Assistant Examiner* — Kirk Hermann

(57) ABSTRACT

A touch display is disclosed including a display module, a polarizer disposed on the display module, and a plurality of touch electrodes at least partly coated on the polarizer, wherein the touch electrodes are formed by nano-silver. Since the touch electrodes formed by nano-silver is employed in the display, a multifunctional touch display is provided. A method for making the touch display is also disclosed.

6 Claims, 8 Drawing Sheets

100
40
23
22
20
21
10
32
30
31

TOUCH DISPLAY AND METHOD FOR MANUFACTURING THE SAME

CROSS-REFERENCE TO RELATED APPLICATIONS

This Application is a continuation of U.S. patent application Ser. No. 14/483,134, filed on Sep. 10, 2014 and which claims priority to China Patent Application No. CN 201310410710.7, filed on Sep. 10, 2013. The entirety of U.S. patent application Ser. No. 14/483,134 and China Patent Application No. CN 201310410710.7 are incorporated by reference herein.

FIELD OF THE INVENTION

The present disclosure relates to displays, and more particularly relates to a touch display and a method for manufacturing the touch display.

BACKGROUND

Display is an output device for presentation of information and has been widely used. According to the different designs, the displays can be divided into a cathode ray tube (CRT) display, a light emitting diode (LED) display, a liquid crystal display (LCD) and plasma (PDP) displays, and so on.

General electronic device often requires an output device and an input device to display electrical signals and receive operating instructions. Conventional display can only output electrical signals for the user, as for receiving operating instructions from the user, an additional input device (such as a mouse or a keyboard) is required. However, the incorporation of multiple devices with single feature will increase the complexity of the electronic device, and it is difficult to achieve light and thin.

Therefore, there is room for improvement within the art.

SUMMARY OF THE INVENTION

The present disclosure is directed to touch display which can both sense touch operations and present information.

A touch display is provided including: a display module; a polarizer disposed on the display module; and a plurality of nano-silver touch electrodes totally or partially integrated with the polarizer.

A method for manufacturing the touch display is also provided, which includes: integrating total or partial plurality of nano-silver touch electrodes to a polarizer to form a touch polarizer; and attaching the touch polarizer to a display module.

In the touch display, the touch electrode made of nano-silver is integrated into the display, such that the display has both displaying and touching features, and the structure is simplified, the light and thin feature is achieved, and occupied space is reduced.

These and other objects, advantages, purposes and features will become apparent upon review of the following specification in conjunction with the drawings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION OF THE EMBODIMENTS

Figure 1:
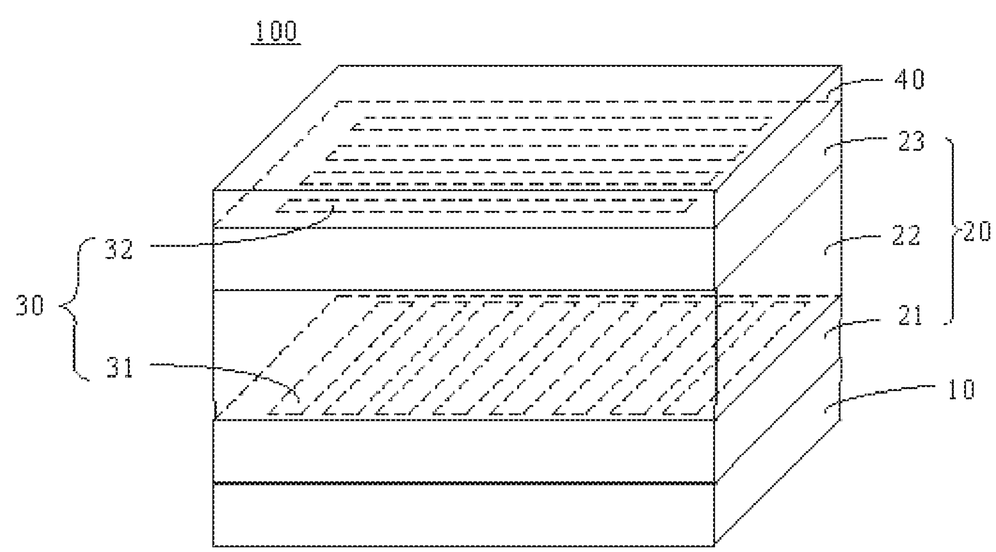
FIG. 1 is a schematic, perspective view of a touch display according to a first embodiment of the present disclosure.

Illustrative embodiments of the disclosure are described below. The following explanation provides specific details for a thorough understanding of and enabling description for these embodiments. One skilled in the art will understand that the disclosure may be practiced without such details. In other instances, well-known structures and functions have not been shown or described in detail to avoid unnecessarily obscuring the description of the embodiments.

Unless the context clearly requires otherwise, throughout the description and the claims, the words “comprise,” “comprising,” and the like are to be construed in an inclusive sense as opposed to an exclusive or exhaustive sense; that is to say, in the sense of “including, but not limited to.” Words using the singular or plural number also include the plural or singular number respectively. Additionally, the words “herein,” “above,” “below” and words of similar import, when used in this application, shall refer to this application as a whole and not to any particular portions of this application. When the claims use the word “or” in reference to a list of two or more items, that word covers all of the following interpretations of the word: any of the items in the list, all of the items in the list and any combination of the items in the list.

The present disclosure is directed towards a touch display, which includes a display module, a polarizer disposed on the display module, and a plurality of nano-silver touch electrodes. The plurality of nano-silver touch electrodes are totally or partially integrated with the polarizer. The polarizer may be directly or indirectly disposed on the display module.

The present disclosure is also directed towards a method for manufacturing the touch screen, which includes but not limited to the following steps: integrating total or partial plurality of nano-silver touch electrodes to a polarizer to form a touch polarizer; and attaching the touch polarizer to a display module. “Touch polarizer” means a polarizer having a touch sensing capability.

The invention will be described in further detail below in conjunction with the drawing.

Referring to FIG. 1, a first embodiment of a touch display 100 includes a display module 10, a polarizer 20 disposed on the display module 10, a plurality of nano-silver touch electrodes 30 integrally formed with the polarizer 20, and a cover plate 40 disposed on the polarizer 20. The cover plate 40 is an optional component and can be omitted as long as the polarizer 20 has enough rigidness and is sufficient to protect subsequent molding components. The polarizer 20 includes a first protective layer 21, a polarizer substrate 22, and a second protective layer 23, wherein the polarizer substrate 22 is sandwiched between the first protective layer 21 and the second protective layer 23.

The plurality of nano-silver touch electrodes 30 can be divided into a plurality of first touch electrodes 31 paralleled arranged along a first direction and a plurality of second touch electrodes 32 paralleled arranged along a second direction. The first touch electrodes 31 are disposed on an upper surface of the first protective layer 21, and the second touch electrodes 32 are disposed on an upper surface of the second protective layer 23. The first touch electrodes 31 and the second touch electrodes 32 are electrically insulated from each other via the polarizer substrate 22 and/or the second protective layer 23. The first direction is unparallel to the second direction; preferably, the first direction is perpendicular to the second direction.

In the illustrated embodiment, a surface of the first protective layer 21 or the second protective layer 23 facing the cover plate 40 is defined as the upper surface, and a surface opposing the upper surface is defined as the lower surface. It should be understood that, as long as the first touch electrodes 31 are disposed on either of the upper or the lower surface of the first protective layer 21, and the second protective layer 23 are disposed on either of the upper or the lower surface of the second protective layer 23, the modifications or changes may be made without departing from the scope of the present invention.

Figure 2:
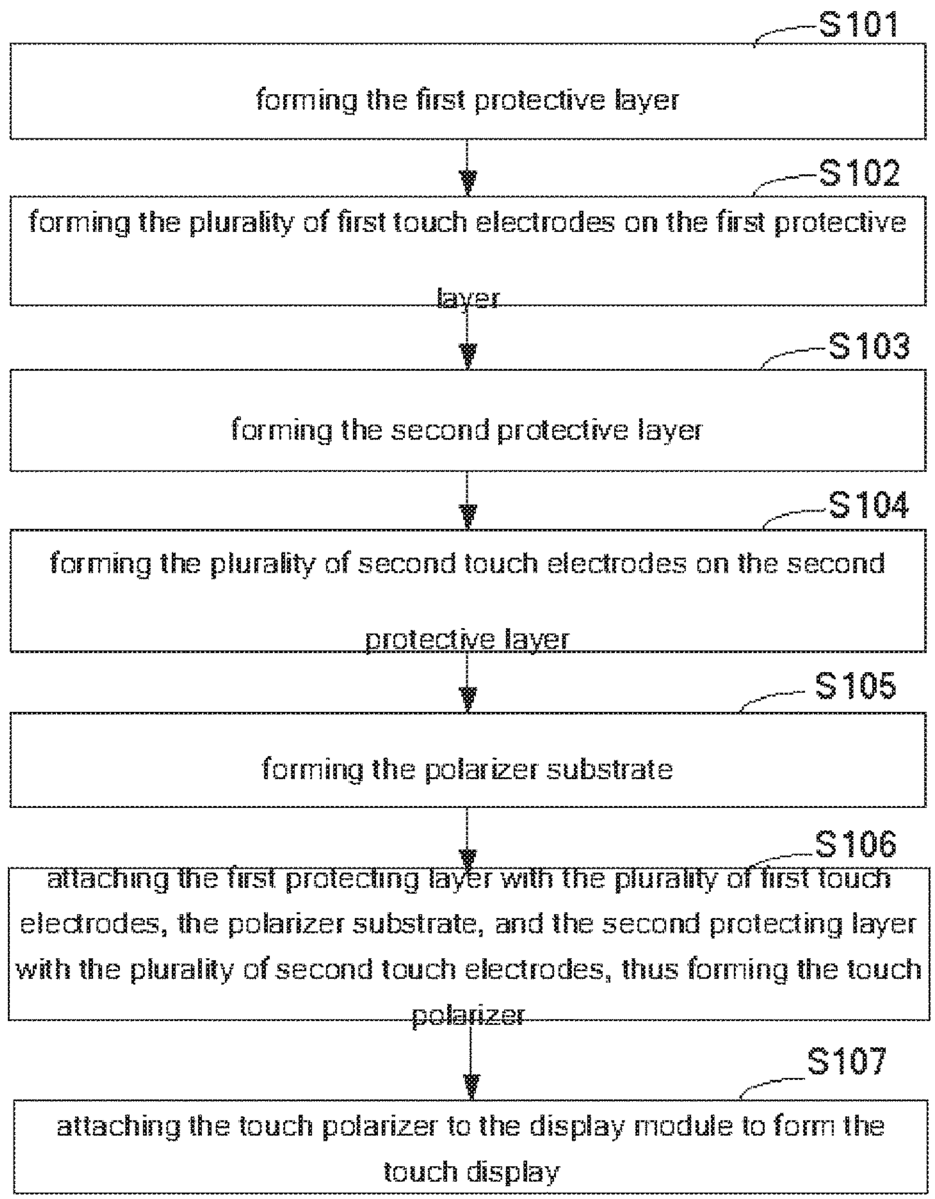
FIG. 2 is a flowchart of an embodiment of a method for manufacturing the touch display of FIG. 1.

Referring to FIG. 2, a flowchart of an embodiment of a method for manufacturing the touch display is shown. The method for manufacturing the touch display 100 may include but not limit to the following steps:

Step S101, the first protective layer 21 is formed.

Step S102, the plurality of first touch electrodes 31 are formed on the first protective layer 21.

Step S103, the second protective layer 23 is formed.

Step S104, the plurality of second touch electrodes 32 are formed on the second protective layer 23.

Step S105, the polarizer substrate 22 is formed.

Step S106, the first protecting layer 21 with the plurality of first touch electrodes 31, the polarizer substrate 22, and the second protecting layer 23 with the plurality of second touch electrodes 32 are attached together, thus forming the touch polarizer 20.

Step S107, the touch polarizer 20 is attached to the display module 10. The attaching may be but not limited to bonding. In an alternative embodiment, the cover plate 40 is further attached to the touch polarizer 20 with the display module 10.

In a preferable embodiment, step S101 and step S102; step S103 and step S104; step S105 may be independently performed and may not limited to the sequence shown in FIG. 2. For example, step S103 and step S104 may be performed prior to or at the same time as step S101 and step S102; step S105 may also be performed prior to or at the same time as step S101 and step S102.

Figure 3:
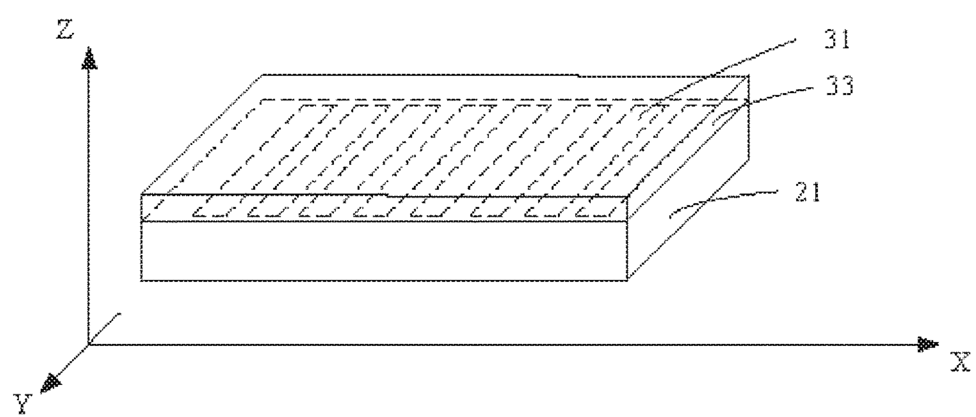
FIG. 3 is a schematic, perspective view of a nano-silver touch electrode shown in FIG. 1.

FIG. 3 is schematic, perspective view of a nano-silver touch electrode shown in FIG. 1. Silver has good electrical conductivities, and the conductive film manufactured based on the nano-silver has a nano-level silver wire diameter, such that it has an excellent optical transmittance. Since nano-silver is easily to be oxidized when exposed to the air, a protective film may be employed to cover its surface. For example, a protective film 33 may be coated on the first touch electrodes 31. The protective film 33 may be made of organic transparent materials, such as epoxy resin, polyimide or methyl methacrylate, etc. The protective film 33 may have a thickness of between about 80 nm to about 120 nm, whereby it can protect the nano-silver touch electrode from being oxidized. The protective film 33 may be omitted, as long as the nano-silver touch electrode itself has antioxidant properties.

A method for manufacturing the nano-silver touch electrode may include:

adding nano-silver to a solvent to form a nano-silver conductive compound;

forming a nano-silver conductive film by wet coating the nano-silver conductive compound to a protective layer (i.e. the first protective layer 21 or the second protective layer 23);

curing the nano-silver conductive film;

forming a protective film (i.e. the protective film 33) on the nano-silver conductive film, which is optional;

etching the nano-silver conductive film to form the plurality of nano-silver touch electrodes (i.e. the first touch electrodes 31 and the second touch electrodes 32).

In the method described above, the wet coating may be spinning coating, roll to roll coating, or spray coating, etc. The etching technology may be a lithography etching process.

Figure 4:
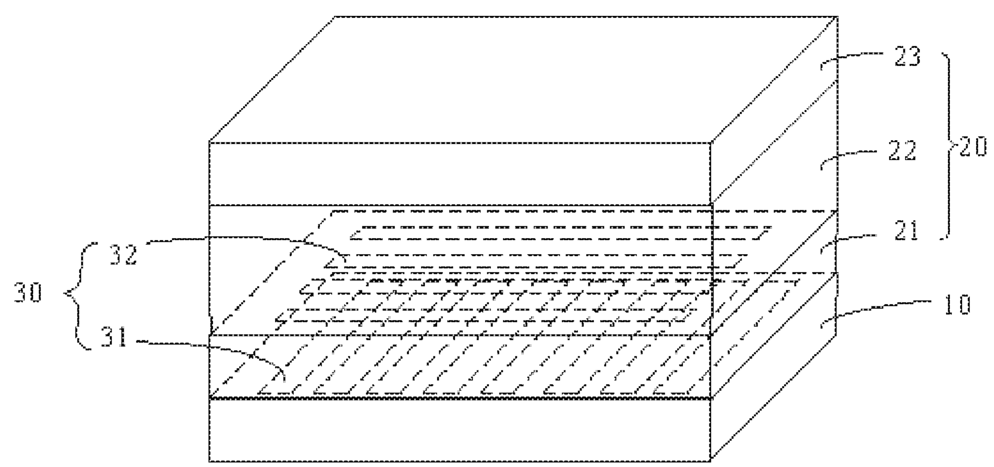
FIG. 4 is a schematic, perspective view of a touch display according to a second embodiment of the present disclosure.

FIG. 4 is a schematic, perspective view of a touch display according to a second embodiment. The second embodiment of the touch display 200 includes a display module 10, a polarizer 20 disposed on the display module 10, and a plurality of nano-silver touch electrodes 30 integrally formed with the polarizer 20. The polarizer 20 includes a first protective layer 21, a polarizer substrate 22, and a second protective layer 23, wherein the polarizer substrate 22 is sandwiched between the first protective layer 21 and the second protective layer 23.

The plurality of nano-silver touch electrodes 30 can be divided into a plurality of first touch electrodes 31 paralleled arranged along a first direction and a plurality of second touch electrodes 32 paralleled arranged along a second direction. The first touch electrodes 31 are disposed on one side (i.e. an upper surface) of the first protective layer 21, and the second touch electrodes 32 are disposed on the other side (i.e. a lower surface) of the first protective layer 21. The first touch electrodes 31 and the second touch electrodes 32 are electrically insulated from each other via the polarizer substrate 22 and/or the second protective layer 23. The first direction is unparallel to the second direction, preferably, the first direction is perpendicular to the second direction.

It should be understood that, other components will not be described in further details, since their manufacturing method or materials have already been described in the first embodiment.

The manufacturing method of the touch display 200 is similar to that of FIG. 2, the difference is that, in step S102, the first touch electrodes 31 are formed on one side of the first protective layer 21, in step S104, the second touch electrodes 32 are formed on the other side of the first protective layer 21. Then the first protecting layer 21 with the plurality of nano-silver touch electrodes 30, the polarizer substrate 22, and the second protecting layer 23 are attached together in step S106, thus forming the touch polarizer 20.

It should be understood that, in alternative embodiments, the first touch electrodes 31 and the second touch electrodes 32 of the nano-silver touch electrodes 30 may be formed on both sides of the second protective layer 23, and other steps are similar to the first embodiment and will not be further described.

Figure 5:
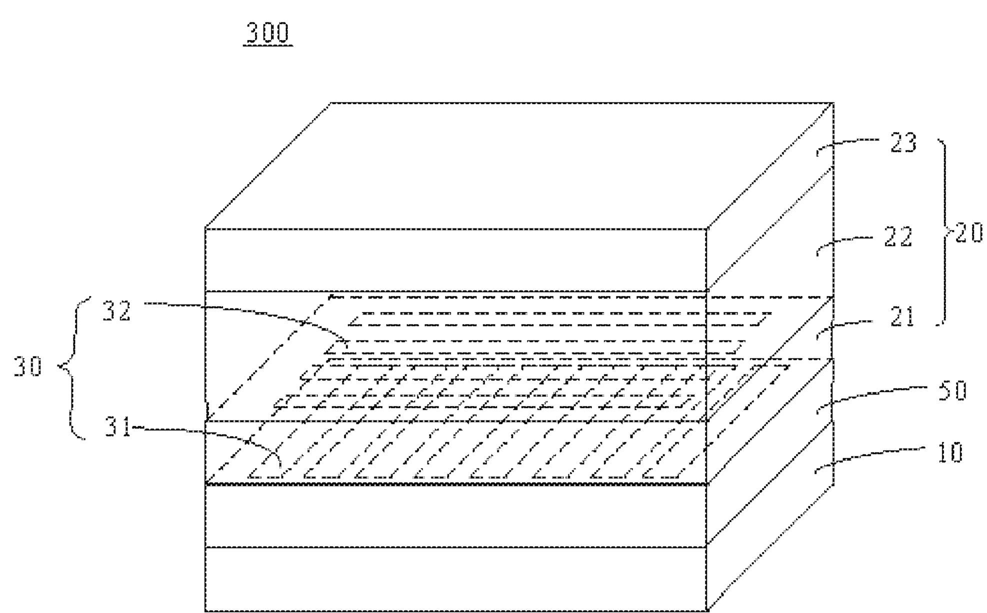
FIG. 5 is a schematic, perspective view of a touch display according to a third embodiment of the present disclosure.

FIG. 5 is a schematic, perspective view of a touch display according to a third embodiment. The third embodiment of the touch display 300 includes a display module 10, an optical film 50 disposed on the display module 10, a polarizer 20 disposed on the optical film 50, and a plurality of nano-silver touch electrodes 30 integrally formed with the polarizer 20. The polarizer 20 includes a first protective layer 21, a polarizer substrate 22, and a second protective layer 23, wherein the polarizer substrate 22 is sandwiched between the first protective layer 21 and the second protective layer 23.

The plurality of nano-silver touch electrodes 30 can be divided into a plurality of first touch electrodes 31 paralleled arranged along a first direction and a plurality of second touch electrodes 32 paralleled arranged along a second direction. The first touch electrodes 31 are disposed on the optical film 50, and the second touch electrodes 32 are disposed on the first protective layer 21 (i.e. an upper surface thereof). The first touch electrodes 31 and the second touch electrodes 32 are electrically insulated from each other via first protective layer 21. The first direction is unparallel to the second direction; preferably, the first direction is perpendicular to the second direction.

It should be understood that, in alternative embodiments, the second touch electrodes 32 may also be disposed on the second protective layer 23 (i.e. an upper surface or a lower surface thereof). Other components will not be described in further details, since their manufacturing method or materials have already been described in the first embodiment.

The manufacturing method of the touch display 300 is similar to that of FIG. 2, the difference is that, in step S102, the first touch electrodes 31 are formed on the optical film 50, in step S104, the second touch electrodes 32 are formed on the first protective layer 21 or the second protective layer 23. Then the first protecting layer 21 or the second protecting layer 23 with the second touch electrodes 32 and the polarizer substrate 22 are attached together in step S106, thus forming the touch polarizer 20.

A step of forming the optical film 50 is further included in the manufacturing method, then the touch polarizer 20, the optical film 50 with the first touch electrodes 31, and the display module 10 are attached together to form the touch display 300. Other steps are similar to the first embodiment and will not be further described.

The optical film according the present embodiment may be a color filter which can accurately select small band light waves to be passed and reflect others undesired light waves, thus improving the optical properties of the touch display. Besides, the optical film 50 can also be optical compensation film, phase compensation plate, transreflective film, optical haze film or antireflection film.

Figure 6:
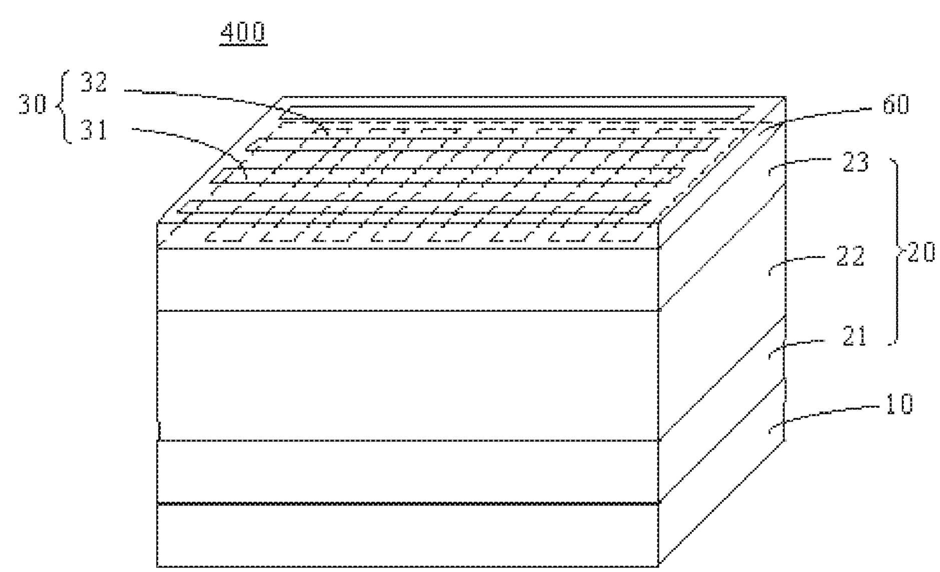
FIG. 6 is a schematic, perspective view of a touch display according to a fourth embodiment of the present disclosure.

FIG. 6 is a schematic, perspective view of a touch display according to a fourth embodiment. The fourth embodiment of the touch display 400 includes a display module 10, a polarizer 20 disposed on the display module 10, and a plurality of nano-silver touch electrodes 30 integrally formed with the polarizer 20. The polarizer 20 includes a first protective layer 21, a polarizer substrate 22, and a second protective layer 23, wherein the polarizer substrate 22 is sandwiched between the first protective layer 21 and the second protective layer 23.

The plurality of nano-silver touch electrodes 30 can be divided into a plurality of first touch electrodes 31 paralleled arranged along a first direction and a plurality of second touch electrodes 32 paralleled arranged along a second direction. The first touch electrodes 31 and the second touch electrodes 32 are disposed on the same side (i.e. the same upper surface or the same lower surface) of the second protective layer 23. The touch display 400 further includes an insulating layer 60 disposed between the plurality of first touch electrodes 31 and the plurality of second touch electrodes 32. The first touch electrodes 31 and the second touch electrodes 32 are electrically insulated from each other via the insulating layer 60. The first direction is unparallel to the second direction; preferably, the first direction is perpendicular to the second direction.

In alternative embodiments, the first touch electrodes 31 and the second touch electrodes 32 are disposed on the same side (i.e. the same upper surface or the same lower surface) of the first protective layer 21. The insulating layer 60 may be made of polymer, i.e. polyimide, or inorganic materials, i.e. Si.sub.3N.sub.4 or SiO.sub.2, etc. It should be understood that, other components will not be described in further details, since their manufacturing method or materials have already been described in the first embodiment.

The manufacturing method of the touch display 400 is similar to that of FIG. 2, the difference is that, in step S102, the first touch electrodes 31 are formed on the second protective layer 23, in step S104, the second touch electrodes 32 are formed on the insulating layer 60. Then the first protecting layer 21, the polarizer substrate 22, and the second protecting layer 23 with the nano-silver touch electrodes 30 and are attached together in step S106, thus forming the touch polarizer 20.

It should be understood that, in alternative embodiments, the nano-silver touch electrodes 30 may be formed on the same side (i.e. the same upper surface or the same lower surface) of the first protective layer 21. Other steps are similar to the first embodiment and will not be further described.

Figure 7:
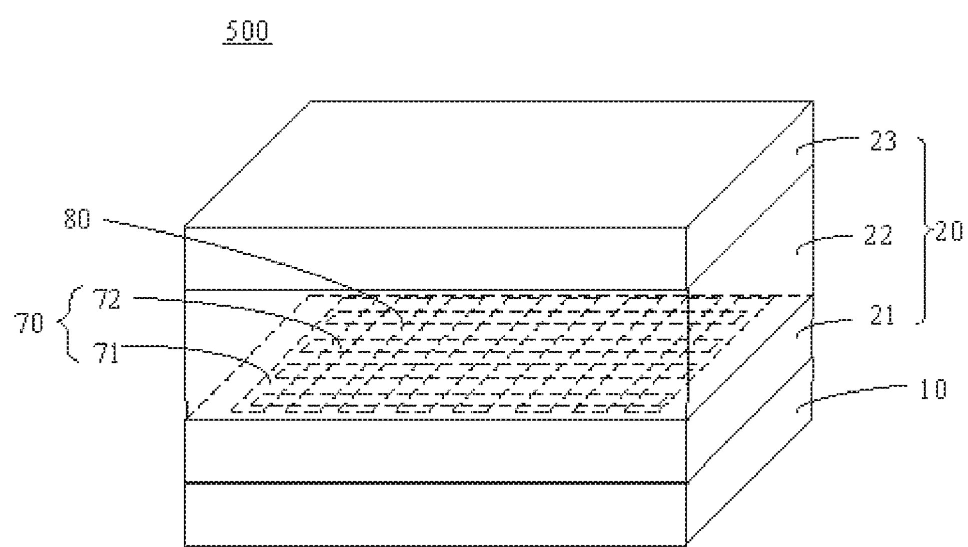
FIG. 7 is a schematic, perspective view of a touch display according to a fifth embodiment of the present disclosure.

FIG. 7 is a schematic, perspective view of a touch display according to a fifth embodiment. The fifth embodiment of the touch display 500 includes a display module 10, a polarizer 20 disposed on the display module 10, and a plurality of nano-silver touch electrodes 70 integrally formed with the polarizer 20. The polarizer 20 includes a first protective layer 21, a polarizer substrate 22, and a second protective layer 23, wherein the polarizer substrate 22 is sandwiched between the first protective layer 21 and the second protective layer 23.

The plurality of nano-silver touch electrodes 70 can be divided into a plurality of first touch electrodes 71 paralleled arranged along a first direction and a plurality of second touch electrodes 72 paralleled arranged along a second direction. The first touch electrodes 71 and the second touch electrodes 72 are cross-arranged on the same side (i.e. the same upper surface or the same lower surface) of the first protective layer 21. The touch display 500 further includes a plurality of isolating pads 80. Each of the plurality of isolating pads 80 is disposed at an intersection of the cross-arranged first touch electrodes 71 and second touch electrodes 72, such that the plurality of first touch electrodes 71 and the plurality of second touch electrodes 72 are electrically insulated from each other via the plurality of isolating pads 80. The first direction is unparallel to the second direction; preferably, the first direction is perpendicular to the second direction.

In alternative embodiments, the first touch electrodes 71 and the second touch electrodes 72 are cross-arranged on the same side (i.e. the same upper surface or the same lower surface) of the second protective layer 23. The isolating pad 80 may be made of polymer, i.e. polyimide, or inorganic materials, i.e. Si.sub.3N.sub.4 or SiO.sub.2, etc. It should be understood that, other components will not be described in further details, since their manufacturing method or materials have already been described in the first embodiment.

Figure 8:
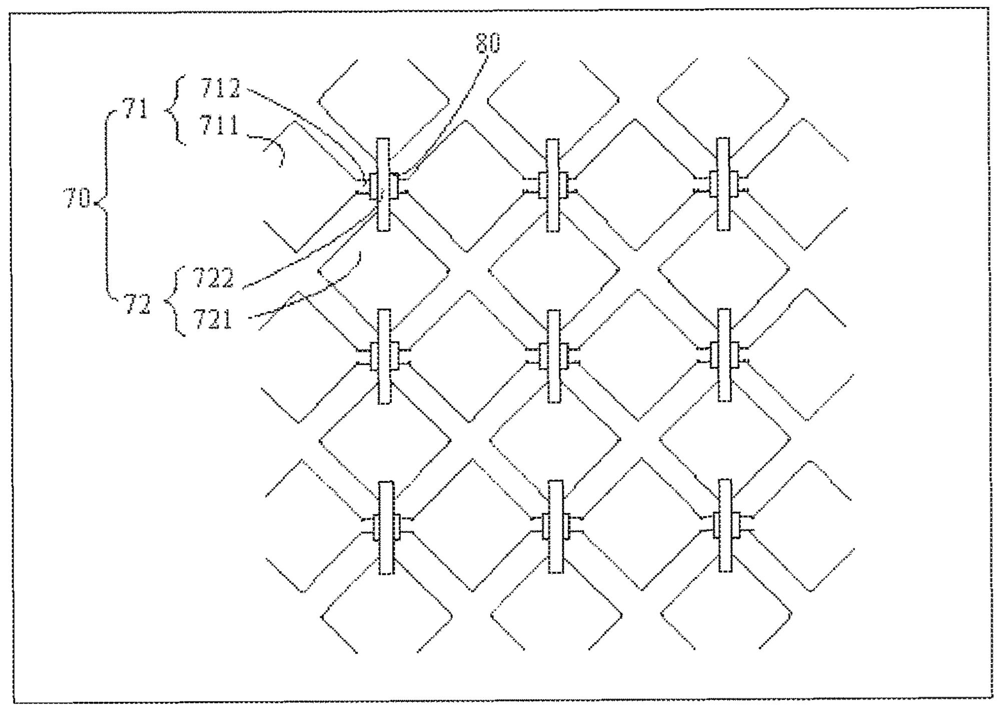
FIG. 8 is a schematic, plan view of a nano-silver touch electrode shown in FIG. 7.

FIG. 8 is a schematic, plan view of a nano-silver touch electrode 70 shown in FIG. 7. Each first touch electrode 71 includes a plurality of first electrode areas 711 and a plurality of first wires 712. Each first wire 712 is located between two adjacent first electrode areas 711 electrically connecting the two adjacent first electrode areas 711. Each second touch electrode 72 includes a plurality of second electrode areas 721 and a plurality of second wires 722. Each second wire 722 is located between two adjacent second electrode areas 721 electrically connecting the two adjacent second electrode areas 721. An isolating pad 80 is disposed between the first wire 712 and the second wire 722 electrically isolating the first wire 712 and the second wire 722.

The manufacturing method of the touch display 500 is similar to that of FIG. 2, the difference is that, in step S102, the first touch electrodes 71, which include the first electrode areas 711 and a plurality of first wires 712, and the second electrode areas 721 of the second touch electrode 72 are formed on the first protective layer 21 simultaneously. In step S104, the second wires 722 of the second touch electrodes 72 are formed on the isolating pad 80, and the second wire 722 electrically connects the two adjacent second electrode areas 721, an extra step of forming the plurality of isolating pads 80 on the corresponding first wires 712. Then the first protecting layer 21 with the nano-silver touch electrodes 70, the polarizer substrate 22, and the second protecting layer 23 are attached together in step S106, thus forming the touch polarizer 20.

It should be understood that, in alternative embodiments, the nano-silver touch electrodes 70 may be formed on the same side (i.e. the same upper surface or the same lower surface) of the second protective layer 23. Other steps are similar to the first embodiment and will not be further described.

In the present embodiments, the display module can be thin film field effect transistor module (TFT-LCD), light emitting diode display module (LED), field emission flat panel display module (FED), plasma flat panel display module (PDP) or organic films electroluminescent module (OLED) and so on.

In the present embodiments, the polarizer is an optical filter that passes light of a specific polarization and blocks waves of other polarizations. It can filter the glare of light, reflected light, etc. according to the polarization characteristics, so that the light becomes polarization and soft, the text shown in the touch module thus becomes clear and sharp. The polarizer substrate can be made of polyvinyl alcohol (PVA). The first protective layer and the second protective layer can be made of triacetate cellulose (TAC), which has a high light transmittance, good water resistance, and good mechanical strength, such that it can support and protect the polarizer substrate.

In the present embodiments, similar to the first embodiment, a cover plate 40 may be additionally disposed on the polarizer 20. The cover plate 40 can be omitted as long as the polarizer 20 has enough rigidness and is sufficient to protect subsequent molding components.

In the present embodiments, the shape of the nano-silver may be a strip-like pattern as in the first to the fourth embodiment, it can also be a diamond pattern as in the fifth embodiment, which is not limited to that.

When the touch display according to the described embodiment is a capacitive touch display, the first touch electrode 31 and the second electrode 32 may form a touch capacitance therebetween, when be touched, the capacitance at the touch point will be changed, the touch position information can be determined by measuring the change of the capacitance. The touch display can be other type of touch displays, such as resistance type, which is not limited to that.

In the touch display, the touch electrode made of nano-silver is integrated into the display, such that the display has both displaying and touching features, and the structure is simplified, light and thin feature is achieved, and occupied space is reduced.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. A touch display, comprising:

a display module;

a polarizer disposed on the display module, wherein:

the polarizer comprises a first protective layer, a polarizer substrate, and a second protective layer, and the polarizer substrate is sandwiched between the first protective layer and the second protective layer;

a plurality of nano-silver touch electrodes totally or partially integrated with the polarizer, wherein:

at least one of the plurality of nano-silver touch electrodes is disposed between the first protective layer and the polarizer substrate or between the second protective layer and the polarizer substrate, and the plurality of nano-silver touch electrodes comprises a plurality of first touch electrodes arranged in parallel along a first direction and a plurality of second touch electrodes arranged in parallel along a second direction; and an optical film disposed between the display module and the polarizer, wherein:

the plurality of first touch electrodes are disposed on the optical film, the plurality of second touch electrodes are disposed on the first protective layer or the second protective layer, and the plurality of first touch electrodes and the plurality of second touch electrodes are electrically insulated from each other via the first protective layer.

2. The touch display according to claim 1, wherein the optical film is selected from the group consisting of a color filter, an optical compensation film, a phase compensation plate, a transreflective film, an optical haze film, and an antireflection film.

3. A method for manufacturing a touch display, comprising:

forming a first protective layer;

forming a plurality of first touch electrodes on the first protective layer;

forming a second protective layer;

forming a plurality of second touch electrodes on the second protective layer;

forming a polarizer substrate;

attaching the first protective layer with the plurality of first touch electrodes to the polarizer substrate;

attaching the second protective layer with the plurality of second touch electrodes to the polarizer substrate, thereby forming a touch polarizer, wherein:

the touch polarizer comprises the first protective layer, the polarizer substrate, and the second protective layer, the polarizer substrate is sandwiched between the first protective layer and the second protective layer, the plurality of first touch electrodes and the plurality of second touch electrodes each comprise a plurality of nano-silver touch electrodes, the plurality of first touch electrodes are arranged in parallel along a first direction and the plurality of second touch electrodes are arranged in parallel along a second direction different than the first direction, and the plurality of first touch electrodes and the plurality of second touch electrodes are electrically insulated from each other via the polarizer substrate; and attaching the touch polarizer to a display module.

4. A touch display, comprising:

a display module;

a polarizer disposed on the display module, wherein:

the polarizer comprises a first protective layer, a polarizer substrate, and a second protective layer, and the polarizer substrate is sandwiched between the first protective layer and the second protective layer; and a plurality of nano-silver touch electrodes totally or partially integrated with the polarizer, wherein:

at least one of the plurality of nano-silver touch electrodes is disposed between the first protective layer and the polarizer substrate or between the second protective layer and the polarizer substrate, the plurality of nano-silver touch electrodes comprises a plurality of first touch electrodes arranged in parallel along a first direction and a plurality of second touch electrodes arranged in parallel along a second direction different than the first direction, the plurality of first touch electrodes are disposed on a first surface of the second protective layer, the plurality of second touch electrodes are disposed on a second surface of the second protective layer, and the plurality of first touch electrodes and the plurality of second touch electrodes are electrically insulated from each other via the second protective layer.

5. A method for manufacturing a touch display, comprising:

forming a plurality of first touch electrodes on an optical film;

forming a plurality of second touch electrodes on a first protective layer;

attaching the optical film with the plurality of first touch electrodes to the first protective layer with the plurality of second touch electrodes, wherein:

a polarizer comprises the first protective layer, a polarizer substrate, and a second protective layer, the polarizer substrate is sandwiched between the first protective layer and the second protective layer, the plurality of first touch electrodes and the plurality of second touch electrodes each comprise a plurality of nano-silver touch electrodes, the plurality of first touch electrodes are arranged in parallel along a first direction and the plurality of second touch electrodes are arranged in parallel along a second direction different than the first direction, and the plurality of first touch electrodes and the plurality of second touch electrodes are electrically insulated from each other via the first protective layer; and attaching the optical film to a display module, wherein the optical film is disposed between the display module and the first protective layer.

6. A method for manufacturing a touch display, comprising:

forming a plurality of first touch electrodes on an optical film;

forming a plurality of second touch electrodes on a second protective layer;

binding together the optical film with the plurality of first touch electrodes, a first protective layer, a polarizer substrate, and the second protective layer with the plurality of second touch electrodes, thereby forming a touch polarizer, wherein:

the touch polarizer comprises the first protective layer, the polarizer substrate, and the second protective layer, the polarizer substrate is sandwiched between the first protective layer and the second protective layer, the plurality of first touch electrodes and the plurality of second touch electrodes each comprise a plurality of nano-silver touch electrodes, the plurality of first touch electrodes are arranged in parallel along a first direction and the plurality of second touch electrodes are arranged in parallel along a second direction different than the first direction, and the plurality of first touch electrodes and the plurality of second touch electrodes are electrically insulated from each other via the first protective layer and/or the polarizer substrate; and attaching the touch polarizer to a display module.

* * * * *